United States Patent
Ishida et al.

(10) Patent No.: US 9,306,212 B2
(45) Date of Patent: Apr. 5, 2016

(54) POSITIVE ACTIVE MATERIAL FOR RECHARGEABLE LITHIUM BATTERY, AND POSITIVE ELECTRODE AND RECHARGEABLE LITHIUM BATTERY INCLUDING THE SAME

(71) Applicant: SAMSUNG SDI CO., LTD., Yongin-si, Gyeonggi-do (KR)

(72) Inventors: Sumihito Ishida, Yongin-si (KR); Jung-Woo An, Yongin-si (KR); Young-Kee Kim, Yongin-si (KR); Jin-Man Jeoung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/103,046

(22) Filed: Dec. 11, 2013

(65) Prior Publication Data

US 2015/0024275 A1    Jan. 22, 2015

Related U.S. Application Data

(60) Provisional application No. 61/856,503, filed on Jul. 19, 2013.

(51) Int. Cl.
| | |
|---|---|
| *H01M 8/10* | (2006.01) |
| *H01M 4/36* | (2006.01) |
| *C01F 7/00* | (2006.01) |
| *C01G 53/04* | (2006.01) |

(Continued)

(52) U.S. Cl.
CPC ............... *H01M 4/36* (2013.01); *C01F 7/002* (2013.01); *C01G 53/04* (2013.01); *H01M 2/16* (2013.01); *H01M 4/131* (2013.01); *H01M 4/1391* (2013.01); *H01M 4/485* (2013.01); *H01M 4/505* (2013.01); *H01M 4/525* (2013.01); *H01M 4/583* (2013.01); *H01M 4/625* (2013.01); *H01M 10/052* (2013.01); *H01M 4/0471* (2013.01); *H01M 2004/021* (2013.01); *H01M 2004/028* (2013.01); *H01M 2220/30* (2013.01)

(58) Field of Classification Search
CPC .............................. H01M 4/405; H01M 4/485
See application file for complete search history.

(56) References Cited

U.S. PATENT DOCUMENTS

| 7,192,672 B2 | 3/2007 | Horichi et al. |
|---|---|---|
| 7,217,406 B2 | 5/2007 | Tsukuma et al. |

(Continued)

FOREIGN PATENT DOCUMENTS

| JP | 3378222 | 12/2002 |
|---|---|---|
| JP | 2008-115075 A | 5/2008 |

(Continued)

OTHER PUBLICATIONS

EPO Search Report dated Dec. 18, 2014, for corresponding European Patent application 14162414.8, (8 pages).

(Continued)

*Primary Examiner* — Jane Rhee
(74) *Attorney, Agent, or Firm* — Lewis Roca Rothgerber Christie LLP

(57) ABSTRACT

A positive active material for a rechargeable lithium battery includes a porous material including primary particles, and secondary particles including aggregates of a plurality of the primary particles. The porous material has a tap density of 0.3 to less than 1.0 g/cc. A positive electrode includes the positive active material. A rechargeable lithium battery includes the positive electrode including the positive active material.

19 Claims, 1 Drawing Sheet

(51) Int. Cl.
*H01M 2/16* (2006.01)
*H01M 4/505* (2010.01)
*H01M 4/525* (2010.01)
*H01M 4/583* (2010.01)
*H01M 10/052* (2010.01)
*H01M 4/131* (2010.01)
*H01M 4/1391* (2010.01)
*H01M 4/485* (2010.01)
*H01M 4/62* (2006.01)
*H01M 4/02* (2006.01)
*H01M 4/04* (2006.01)

(56) References Cited

U.S. PATENT DOCUMENTS

| | | | |
|---|---|---|---|
| 7,316,862 B2 | 1/2008 | Uchitomi et al. | |
| 7,604,899 B2 | 10/2009 | Oda et al. | |
| 2009/0297947 A1* | 12/2009 | Deng et al. | 429/218.1 |
| 2011/0027651 A1 | 2/2011 | Sun et al. | |
| 2012/0196185 A1* | 8/2012 | Kono et al. | 429/221 |
| 2012/0244425 A1* | 9/2012 | Tokuda | 429/199 |
| 2013/0029216 A1 | 1/2013 | Kim et al. | |
| 2014/0225031 A1 | 8/2014 | Yasuda et al. | |

FOREIGN PATENT DOCUMENTS

| | | |
|---|---|---|
| JP | 2009-32647 A | 2/2009 |
| JP | 4254267 B2 | 2/2009 |
| JP | 2009-117241 A | 5/2009 |
| JP | 2011-228292 A | 11/2011 |
| JP | 4996117 B2 | 5/2012 |
| KR | 10-0946387 | 3/2010 |
| WO | WO 2013/047569 A1 | 4/2013 |

OTHER PUBLICATIONS

English Machine Translation of Japanese Publication No. JP 2000-323142, corresponding to JP 3378222, 11 pages.
English Machine Translation of Japanese Publication No. JP 2009-117241 A, listed above, 64 pages.
English Machine Translation of Japanese Publication No. JP 2009-32647 A, listed above, 50 pages.

* cited by examiner

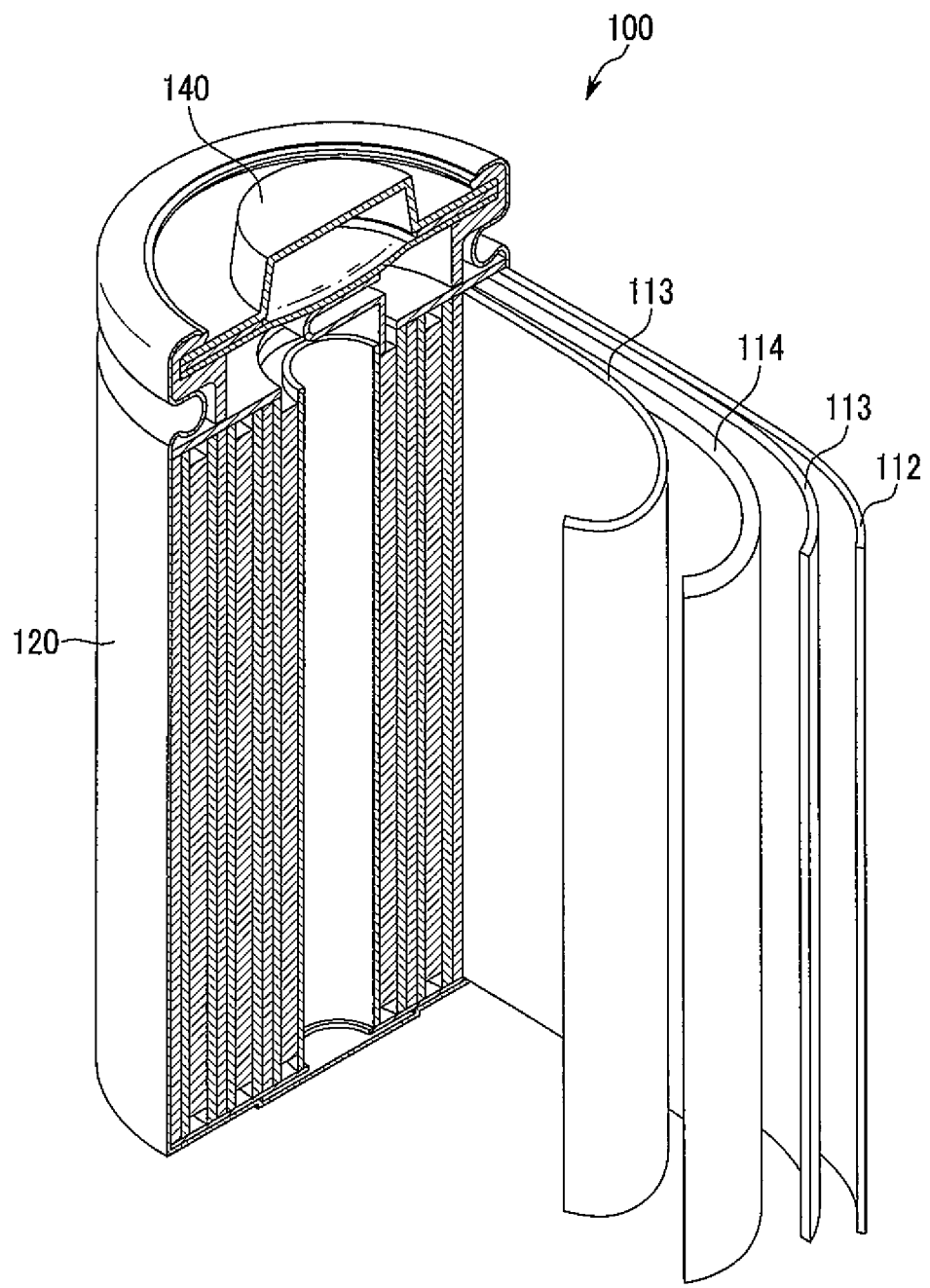

POSITIVE ACTIVE MATERIAL FOR RECHARGEABLE LITHIUM BATTERY, AND POSITIVE ELECTRODE AND RECHARGEABLE LITHIUM BATTERY INCLUDING THE SAME

CROSS-REFERENCE TO RELATED APPLICATION

This application claims priority to and the benefit of U.S. Provisional Application No. 61/856,503, filed on Jul. 19, 2013 in the U.S. Patent and Trademark Office, the entire content of which is incorporated herein by reference.

BACKGROUND

1. Technical Field

Aspects of embodiments relate to a positive active material for a rechargeable lithium battery and a positive electrode and rechargeable lithium battery including the same.

2. Description of the Related Art

In recent times, due to reductions in the size and weight of portable electronic equipment, rechargeable lithium batteries having both high performance and large capacity have been researched for use in portable electronic equipment.

A rechargeable lithium battery can be manufactured by injecting an electrolyte into a battery cell that includes a positive electrode including a positive active material capable of intercalating/deintercalating lithium ions and a negative electrode including a negative active material capable of intercalating/deintercalating lithium ions.

As the positive active material, $LiCoO_2$ has been widely used, but $LiCoO_2$ has high manufacturing cost and there is an unstable supply due to the scarcity of cobalt (Co).

SUMMARY

Aspects of one embodiment relate to a positive active material for a rechargeable lithium battery having high power characteristics and good cycle-life characteristics during charge and discharge at high power.

Aspects of another embodiment relate to a positive electrode for a rechargeable lithium battery including the positive active material for a rechargeable lithium battery.

Aspects of yet another embodiment relate to a rechargeable lithium battery including the positive active material for a rechargeable lithium battery.

According to aspects of one embodiment, a positive active material for a rechargeable lithium battery including a porous material includes primary particles, and secondary particles including aggregates of a plurality of the primary particles. The porous material may have a tap density of 0.3 g/cc to less than 1.0 g/cc.

The tap density of the porous material may be less than or equal to ¼ of a true density of the porous material.

The primary particles may have an average particle diameter ($D_{50}$) of 50 to 300 nm. The secondary particles may have an average particle diameter ($D_{50}$) of 2 to 7 μm.

The tap density of the porous material may be greater than or equal to ⅙ of a true density of the porous material and less than or equal to ¼ of the true density of the porous material.

In some embodiments, the primary particles and the secondary particles each include a compound selected from lithium manganese oxides, doped lithium manganese oxides, lithium nickel cobalt manganese oxides, doped lithium nickel cobalt manganese oxides, lithium nickel cobalt aluminum oxides, and doped lithium nickel cobalt aluminum oxides.

In some embodiments, the primary particles and the secondary particles each include a compound represented by one of Chemical Formulae 1 to 3.

$$LiMn_{2-x}M^1_xO_4 \qquad \text{Chemical Formula 1}$$

In Chemical Formula 1, $M^1$ is Mg, Na, Ca, Sr, Ti, Al, Co, Ni, Fe, Cu, Si, Sn, or a combination thereof, and $0 \le x < 2$.

$$LiNi_aCo_bMn_cM^2_dO_4 \qquad \text{Chemical Formula 2}$$

In Chemical Formula 2, $M^2$ is Mg, Na, Ca, Sr, Ti, Al, Fe, Cu, Si, Sn, or a combination thereof, $0 < a < 1$, $0 < b < 1$, $0 < c < 1$, $0 \le d < 1$, and $a+b+c+d=1$.

$$LiNi_eCo_fAl_gM^3_hO_4 \qquad \text{Chemical Formula 3}$$

In Chemical Formula 3, $M^3$ is Mg, Na, Ca, Sr, Ti, Mn, Fe, Cu, Si, Sn, or a combination thereof, $0 < e < 1$, $0 < f < 1$, $0 < g < 1$, $0 \le h < 1$, and $e+f+g+h=1$.

The positive active material may further include activated carbon. The activated carbon may be included in the positive active material in an amount of 2 to 10 wt %, based on a total amount of the positive active material.

Aspects of another embodiment are directed toward a positive electrode for a rechargeable lithium battery including the positive active material.

The positive electrode may have an active mass density of 1.5 to 3.0 g/cc.

Aspects of yet another embodiment are directed toward a rechargeable lithium battery including the positive electrode including the positive active material; a negative electrode including a negative active material; and a separator between the negative electrode and the positive electrode. The rechargeable lithium battery may further include an electrolyte solution.

The negative active material may include amorphous carbon.

The separator may include cellulose.

Aspects of another embodiment are directed toward a method for preparing a positive active material for a rechargeable lithium battery. The method includes: mixing a metal raw material and an alkaline material to prepare a mixed solution; obtaining composite alkaline particles from the mixed solution; mixing the composite alkaline particles and a lithium raw material to prepare a mixture; and heat treating the mixture to prepare a porous material including primary and secondary particles. The porous material has a tap density of 0.3 to 1.0 g/cc, and the tap density of the porous material is less than or equal to ¼ of the true density of the porous material.

The heat treating may include heating at a temperature of 600 to 1000° C.

The metal raw material may be a metal-containing acetate, a metal-containing nitrate, a metal-containing hydroxide, a metal-containing oxide, a metal-containing sulfate, or a combination thereof.

The lithium raw material may be a lithium carbonate, a lithium acetate, a lithium hydroxide, or a combination thereof.

The alkaline material may be ammonium hydroxide ($NH_4OH$), sodium hydroxide (NaOH), or a combination thereof.

The ratio of composite alkaline particles and lithium raw material may be 1:1.01 to 1:1.10.

Aspects of other embodiments are included in the following detailed description.

According to aspects of embodiments, a rechargeable lithium battery having high power characteristics and good cycle-life characteristics during charge and discharge with high power may be realized.

BRIEF DESCRIPTION OF THE DRAWING

These and other features and advantages of the present invention will be better understood by reference to the following detailed description, taken in conjunction with the accompanying drawing, which is a schematic view of a rechargeable lithium battery according to aspects of one embodiment.

DETAILED DESCRIPTION

In the following detailed description, certain embodiments are shown and described, and are presented for illustrative purposes. As those skilled in the art would realize, the described embodiments may be modified in various different ways without departing from the spirit or scope of the present disclosure. Accordingly, the drawings and description are to be regarded as illustrative in nature and not restrictive. In addition, when an element is referred to as being "on" another element, it can be directly on the other element or indirectly on the other element with one or more intervening elements therebetween. Also, throughout the description, like reference numerals refer to like elements. Hereinafter, certain exemplary embodiments are described. However, these embodiments are presented for illustrative purposes, and this disclosure is not limited thereto.

A positive active material for a rechargeable lithium battery according to one embodiment includes a porous material having pores.

The porous material may have a tap density of greater than or equal to 0.3 g/cc and less than 1.0 g/cc, for example, greater than or equal to 0.6 g/cc and less than 0.9 g/cc. When the porous material has a tap density within either of the foregoing ranges, lithium ions are actively diffused, and thus, the internal resistance of the positive electrode including the porous material may be decreased and the high power characteristics of a rechargeable lithium battery including the positive electrode may be improved.

The tap density relates to (or indicates) a density of the total volume of the porous material. The tap density may be measured according to the following method.

After measuring a mass (A) of a 100 cc cell, the cell is filled by naturally dropping a specimen including the porous material through a mesh. Subsequently, a mass (B) and a charge volume (D) of the porous material after tapping 200 times using a device equipped with a spacer (a Tap Denser KYT-3000, available from Seishin Enterprise Co., Ltd.) is measured and used to calculate the tap density according to the following Equation 1.

$$\text{Tap density (g/cc)} = (B-A)/D \qquad \text{Equation 1}$$

The porous material may have a pore shape adjusted by controlling the ratio between a true density and a tap density of the porous material. By controlling the pore shape of the porous material, the output characteristics of a rechargeable lithium battery including the porous material can be improved.

For example, the porous material may have a ratio of the tap density relative to the true density of less than or equal to ¼, for example, greater than or equal to ⅙ and less than or equal to ¼. When the porous material has a ratio adjusted to be within either of the foregoing ranges, lithium ions are more actively diffused, and thus, the internal resistance of a positive electrode including the porous material may be decreased and the high power characteristics of a rechargeable lithium battery including the positive electrode may be further improved.

The true density relates to (or indicates) a density of the volume of a material of the porous material, for example, a density of the volume of the porous material excepting (or not including) the volume of the pores in the porous material.

The true density, as described above, may be measured using a vapor exchange method.

In the vapor exchange method, the volume of a sample may be obtained by changing the volume of a gas, such as He, that is in contact with the sample, and changing the pressure of the gas at a predetermined (or set) temperature. The true density of the sample may be determined from the volume and weight of the sample. Herein, the measurement is performed by using a device, such as an Accupyc1330 pycnometer, available from Shimadzu Co.

The porous material may include primary particles and secondary particles agglomerated from a plurality of the primary particles. The size of the primary or secondary particles may be adjusted, and thus, the output characteristics of a rechargeable lithium battery including the porous material may be improved.

For example, an average particle diameter ($D_{50}$) of the primary particle may be 50 to 300 nm, for example, 100 to 200 nm. When the primary particle has a size adjusted to be within either of the foregoing ranges, lithium ions are more actively diffused, and thus, the internal resistance of a positive electrode including the porous material may be further decreased and the high power characteristics of a rechargeable lithium battery including the positive electrode may be improved.

As used herein, "$D_{50}$" refers to a particle diameter corresponding to 50 volume % of a cumulative volume of particles in a particle distribution. The average particle diameter ($D_{50}$) of the primary particles may be measured using an S4500 scanning electron microscope, available from Hitachi Ltd.

An average particle diameter ($D_{50}$) of the secondary particle may be 2 to 7 μm, for example, 3 to 5 μm. When the secondary particle has a particle size adjusted to be within either of the foregoing ranges, lithium ions may be more actively diffused, and thus, the internal resistance of a positive electrode including the porous material may be decreased and the high power characteristics of a rechargeable lithium battery including the positive electrode may be improved.

As noted above, "$D_{50}$" refers to a particle diameter corresponding to 50 volume/0 of a cumulative volume of particles in a particle distribution. The average particle diameter ($D_{50}$) of the secondary particles may be measured using an LA-910 laser diffraction particle size analyzer, available from Horiba International Co.

The porous material may include at least one compound represented by one of the following Chemical Formulae 1 to 3.

$$LiMn_{2-x}M^1_xO_4 \qquad \text{Chemical Formula 1}$$

In Chemical Formula 1, $M^1$ is Mg, Na, Ca, Sr, Ti, Al, Co, Ni, Fe, Cu, Si, Sn, or a combination thereof, and $0 \le x < 2$.

The compound represented by the above Chemical Formula 1 may be a lithium manganese oxide, or a lithium manganese oxide in which a metal ($M^1$) is doped (e.g., a lithium manganese oxide doped with $M^1$).

$$LiNi_aCo_bMn_cM^2_dO_4 \qquad \text{Chemical Formula 2}$$

In Chemical Formula 2, $M^2$ is Mg, Na, Ca, Sr, Ti, Al, Fe, Cu, Si, Sn, or a combination thereof, $0<a<1$, $0<b<1$, $0<c<1$, $0 \le d<1$, and $a+b+c+d=1$.

The compound represented by the above Chemical Formula 2 may be a lithium nickel cobalt manganese oxide, or a lithium nickel cobalt manganese oxide in which a metal ($M^2$) is doped (e.g., a lithium nickel cobalt manganese oxide doped with $M^2$).

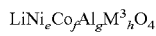

Chemical Formula 3

In Chemical Formula 3, $M^3$ is Mg, Na, Ca, Sr, Ti, Mn, Fe, Cu, Si, Sn, or a combination thereof, $0<e<1$, $0<f<1$, $0<g<1$, $0 \leq h<1$, and $e+f+g+h=1$.

The compound represented by the above Chemical Formula 3 may be a lithium nickel cobalt aluminum oxide, or a lithium nickel cobalt aluminum oxide in which a metal ($M^3$) is doped (e.g., a lithium nickel cobalt aluminum oxide doped with $M^3$).

When a compound respectively doped with metals $M^1$ to $M^3$ in the above Chemical Formulae 1 to 3 is used, structural changes of the compound (or material), such as partial crystal collapse (e.g., a partial collapse of a crystal structure of the compound), are suppressed (or reduced) and the high power cycle-life characteristics of a battery including the compound are further improved.

The porous material may be prepared by mixing a metal raw material and an alkaline material, for example, ammonium hydroxide ($NH_4OH$) or sodium hydroxide (NaOH), to prepare a mixed solution, obtaining composite alkaline particles from the mixed solution, mixing the composite alkaline particles with a lithium raw material to prepare a mixture, and heat-treating the mixture.

The metal raw material may be a metal-containing acetate, a metal-containing nitrate, a metal-containing hydroxide, a metal-containing oxide, a metal-containing sulfate, or the like, but the metal raw material is not limited thereto. The metal may be one of the metals described above in connection with Chemical Formulae 1 to 3 (e.g., metals $M^1$ to $M^3$).

The lithium raw material may be a lithium carbonate, a lithium acetate, a lithium hydroxide, or the like.

The tap density, true density, and particle size of the porous material may be adjusted by controlling the temperature of the heat-treating.

For example, the heat-treating may be performed at a temperature of 600 to 1000° C., for example, 800 to 1000° C., or 900 to 1000° C. When the heat-treating is performed within any of the foregoing temperature ranges, the tap density, true density, and particle size of the porous material are adjusted within an appropriate range, as described herein, thereby obtaining a rechargeable lithium battery with high power characteristics.

In addition, the tap density and particle size may be adjusted by controlling the mixing ratio of the raw materials and a mixing ratio of composite alkaline particles and lithium raw material to promote (or facilitate) a synthesis reaction.

The ratio of composite alkaline particles and lithium raw material may be 1:1.01 to 1:1.10, for example, 1:1.02 to 1:1.06.

The positive active material may include activated carbon along with the porous material. When activated carbon is included in the positive active material with the porous material, buffering effects due to absorption/desorption of lithium ions or fluorophosphate ions may further improve the high power cycle-life characteristics of a battery including the positive active material and, for example, the cycle-life characteristics at low temperature.

The activated carbon may be included in the positive active material in an amount of 2 to 10 wt %, for example, 4 to 6 wt %, based on the total amount of the positive active material, for example the total amount of the porous material and the activated carbon together. When the activated carbon is included in an amount within either of the foregoing ranges, the high power cycle-life characteristics of a battery including the positive active material, for example, the cycle-life characteristics at low temperature may be further improved.

Hereinafter, a rechargeable lithium battery including the positive active material is described with reference to the accompanying drawing.

The accompanying drawing is a schematic view of a lithium rechargeable battery according to one embodiment.

Referring to the accompanying drawing, a rechargeable lithium battery 100 according to one embodiment includes an electrode assembly including a positive electrode 114, a negative electrode 112 facing the positive electrode 114, a separator 113 between the negative electrode 112 and the positive electrode 114, an electrolyte solution impregnating the separator 113, a battery case 120 including the electrode assembly, and a sealing member 140 sealing the battery case 120.

The positive electrode 114 includes a current collector and a positive active material layer on the current collector. The positive active material layer includes a positive active material, a binder, and, optionally, a conductive material.

The current collector may be Al, but the current collector is not limited thereto.

The positive active material is as described above.

The binder improves the binding properties of the positive active material particles to one another and to the current collector. Non-limiting examples of the binder include polyvinyl alcohol, carboxymethyl cellulose, hydroxypropyl cellulose, diacetyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material improves the conductivity of the electrode. Any suitable, electrically conductive material may be used as the conductive material so long as it does not cause a chemical change in the battery. Non-limiting examples thereof include one or more of natural graphite, artificial graphite, carbon black, acetylene black, ketjen black, carbon fibers, metal powders or metal fibers of copper, nickel, aluminum, silver, or the like, and conductive materials such as polyphenylene derivatives and the like.

The positive electrode may have an active mass density of 1.5 to 3.0 g/cc, for example, 1.8 to 2.6 g/cc. When the positive electrode has an active mass density within either of the foregoing ranges, lithium ions are more actively diffused, and the internal resistance of a positive electrode including the porous material may be decreased and the high power characteristics of a rechargeable lithium battery including the positive electrode may be further improved.

The active mass density of the active material is determined by cutting an electrode plate into a disk having a diameter of 5 cm and measuring its thickness and weight. Subsequently, the weight and thickness of the current collector of the disk are subtracted from the thickness and weight of the disk to determine the volume and weight of the positive active material layer, which are used to calculate the active mass density of the active material.

The negative electrode 112 includes a negative current collector and a negative active material layer on the negative current collector.

The negative current collector may be a copper foil, but the negative current collector is not limited thereto.

The negative active material layer may include a negative active material, a binder, and, optionally, a conductive material.

The negative active material may include a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material, which may be any suitable carbon-based negative active material generally used in lithium ion rechargeable batteries. Non-limiting examples thereof include crystalline carbon, amorphous carbon, and mixtures thereof. The crystalline carbon may be non-shaped, or sheet, flake, spherical, or fiber shaped natural graphite or artificial graphite, but the crystalline carbon is not limited thereto. The amorphous carbon may be a soft carbon, a hard carbon, a mesophase pitch carbonized product, fired coke, or the like, but the amorphous carbon is not limited thereto.

Non-limiting examples of the lithium metal alloy include lithium and an additional metal, such as Na, K, Rb, Cs, Fr, Be, Mg, Ca, Sr, Si, Sb, Pb, In, Zn, Ba, Ra, Ge, Al, or Sn.

The material capable of doping and dedoping lithium may be Si, $SiO_x$ (0<x<2), a Si—C composite, a Si-Q alloy (where Q is an alkali metal, an alkaline-earth metal, a Group 13 to 16 element, a transition metal, a rare earth element, or a combination thereof, but is not Si), Sn, $SnO_2$, a Sn—C composite, Sn—R (where R is an alkali metal, an alkaline-earth metal, a Group 13 to 16 element, a transition metal, a rare earth element, or a combination thereof, but is not Sn), or the like, and at least one of these may be mixed with $SiO_2$, but the material capable of doping and dedoping lithium is not limited thereto. Non-limiting examples of Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The transition metal oxide may be vanadium oxide, lithium vanadium oxide, or the like, but the transition metal oxide is not limited thereto.

When the amorphous carbon, such as soft carbon or hard carbon, a mesophase pitch carbonized product, fired coke, or the like is used as the negative active material, lithium ions are absorbed/desorbed inside a pore and are not extracted during high power charging and discharging, thereby further improving the cycle-life characteristics of a rechargeable lithium battery including the amorphous carbon.

The binder improves the binding properties of the negative active material particles to one another and to the current collector. Non-limiting examples thereof include polyvinyl alcohol, carboxymethyl cellulose, hydroxypropyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material improves the conductivity of the electrode. Any suitable, electrically conductive material may be used as the conductive material so long as it does not cause a chemical change in the battery. Non-limiting examples thereof include carbon-based materials, such as natural graphite, artificial graphite, carbon black, acetylene black, ketjen black, carbon fibers, and the like; metal-based materials, such as metal powders or metal fibers of copper, nickel, aluminum, silver, and the like; conductive polymers, such as polyphenylene derivatives and the like; and mixtures thereof.

The negative and positive electrodes 112 and 114 may each be manufactured by mixing the active material, conductive material, and binder to prepare an active material composition, and coating the composition on a current collector. The electrode manufacturing method is known. The solvent includes N-methylpyrrolidone or the like, but the solvent is not limited thereto.

The electrolyte solution includes a non-aqueous organic solvent and a lithium salt.

The non-aqueous organic solvent serves as a medium for transmitting the ions taking part in the electrochemical reactions of the battery. The non-aqueous organic solvent may be a carbonate-based, ester-based, ether-based, ketone-based, alcohol-based, or aprotic solvent, but the non-aqueous organic solvent is not limited thereto.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like, but the carbonate-based solvent is not limited thereto.

When a mixture of linear carbonate compounds and cyclic carbonate compounds are used as the solvent, the organic solvent can have a high dielectric constant and low viscosity. The cyclic carbonate and the linear carbonate are mixed together in a volume ratio of about 1:1 to about 1:9.

In addition, the ester based solvent may be, for example, methylacetate, ethylacetate, n-propylacetate, dimethylacetate, methylpropionate, ethylpropionate, γ-butyrolactone, decanolide, valerolactone, mevalonolactone, caprolactone, or the like, but the ester based solvent is not limited thereto. The ether based solvent may be, for example, dibutylether, tetraglyme, diglyme, dimethoxyethane, 2-methyltetrahydrofuran, tetrahydrofuran, or the like, but the ether based solvent is not limited thereto. The ketone based solvent may be cyclohexanone, or the like, but the ketone based solvent is not limited thereto. The alcohol based solvent may be ethanol, isopropyl alcohol, or the like, but the alcohol based solvent is not limited thereto.

A single non-aqueous organic solvent may be used, or a mixture of solvents may be used. When a mixture of organic solvents is used, the mixture ratio may be controlled in accordance with the desired battery performance.

The non-aqueous electrolyte solution may further include an overcharge inhibition additive, such as, for example, ethylenecarbonate, pyrocarbonate, or the like.

The lithium salt is dissolved in the organic solvent, supplies the lithium ions in the battery, enables the basic operation of the rechargeable lithium battery, and improves lithium ion transportation between the positive and negative electrodes.

Non-limiting examples of the lithium salt include $LiPF_6$, $LiBF_4$, $LiSbF_6$, $LiAsF_6$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate, LiBOB), or a combination thereof.

The lithium salt may be present in the electrolyte at a concentration of about 0.1 M to about 2.0 M. When the lithium salt is included within the above concentration range, the electrolyte may have good performance and lithium ion mobility due to suitable electrolyte conductivity and viscosity.

The separator 113 may include any materials generally used in lithium batteries so long as it separates the negative electrode 112 from the positive electrode 114 and provides a transporting passage for lithium ions. For example, the separator 113 may have low resistance to ion transportation and good electrolyte impregnation properties. For example, the separator may be selected from glass fiber, polyester, tetrafluoroethylene (e.g., TEFLON®; TEFLON® is a registered trademark of E.I. du Pont de Nemours and Company), polyethylene, polypropylene, polytetrafluoroethylene (PTFE), or a combination thereof, but the separator is not limited thereto. The separator may be a non-woven fabric or a woven fabric. For example, a polyolefin-based polymer separator, such as polyethylene, polypropylene or the like may be used in a lithium ion battery, but the separator is not limited thereto. In order to provide heat resistance or mechanical strength, a coated separator including a ceramic component or a polymer material may be used. Also, the separator may have a monolayered or multi-layered structure.

When cellulose, which has high permeability, is used as the separator, lithium ions are not hindered from movement at low temperatures due to an increased viscosity of the electrolyte solution in the separator, and thus, including cellulose in the separator may further improve cycle-life characteristics at low temperatures.

Hereinafter, embodiments of the present disclosure are illustrated with reference to examples. However, the examples are presented for illustrative purposes only, and the present disclosure is not limited to the examples.

Furthermore, what is not described in this disclosure may be sufficiently understood by those having ordinary skill in this field.

Preparation of Porous Material

Preparation Example 1

A nickel sulfate aqueous solution, a cobalt sulfate aqueous solution, and a manganese sulfate aqueous solution were mixed in an atomic ratio of Ni:Co:Mn of 1:1:1 to prepare a mixed solution. Subsequently, the mixed solution and an ammonium sulfate aqueous solution (as a complexing or complex agent) were sequentially added to a reaction bath, and a sodium hydroxide aqueous solution was added dropwise thereto until the solution in the reaction bath had a pH of 11, thereby forming nickel cobalt manganese composite hydroxide particles. The particles were filtered, washed with water, and dried at 100° C., thereby forming a dry powder. The dry powder was mixed with lithium carbonate powder at a ratio of 1:1.05 (dry powder:lithium carbonate powder), and the mixture was fired at 950° C. for 10 hours under an air atmosphere, thereby preparing a porous material (NCM) including primary particles and secondary particles including (e.g., formed from) the primary particles.

Preparation Example 2

A nickel sulfate aqueous solution, a cobalt sulfate aqueous solution, and an aluminum hydroxide were mixed in an atomic ratio of Ni:Co:Al of 80:15:5 to prepare a mixed solution. Subsequently, the mixed solution and an ammonium sulfate aqueous solution (as a complex agent or complexing agent) were sequentially added to a reaction bath, and a sodium hydroxide aqueous solution was added dropwise thereto until the resulting solution in the reaction bath had a pH of 11, thereby forming nickel cobalt aluminum composite hydroxide particles. The particles were filtered, washed with water, and dried at 100° C., thereby forming a dry powder. The dry powder was mixed with lithium carbonate powder at a ratio of 1:1.03 (dry powder:lithium carbonate powder), and the mixture was dried at 800° C. for 10 hours under an oxygen atmosphere, thereby preparing a porous material (NCA) including primary particles and secondary particles including (e.g., formed from) the primary particles.

Preparation Example 3

A mixture was formed by mixing the dry powder (e.g., dry nickel cobalt manganese composite hydroxide powder) of Preparation Example 1 with lithium carbonate powder and magnesium hydroxide until the magnesium hydroxide was included in the mixture in a mole ratio of 1%, and the mixture was fired at 950° C. for 10 hours under the air atmosphere, thereby preparing a porous material (NCM+Mg) including primary particles and secondary particles including (e.g., formed from) the primary particles.

Evaluation 1: Tap Density, True Density, and Particle Size of Porous Material

The tap density, true density, and particle size of the porous materials of Preparation Examples 1 to 3 were measured according to the following methods, and the results are provided in the following Table 1.

(Tap Density Measurement)

The mass (A) of a 100 cc cell was measured, and the porous material specimens of each of Preparation Examples 1 to 3 were naturally dropped in the cell through a 200 mesh to charge the cell. Subsequently, the mass (B) and charge volume (D) of each cell after tapping 200 times were measured using a device having a 4 cm spacer (a Tap Denser KYT-3000, available from Seishin Enterprise Co., Ltd.), and the tap density of each cell was calculated according to the following Equation 1.

$$\text{Tap density (g/cc)} = (B-A)/D \qquad \text{[Equation 1]}$$

(True Density Measurement)

The porous material specimens of each of Preparation Examples 1 to 3 were injected into a container, the true density of the porous materials were measured using an Accupyc1330 pycnometer (available from Shimadzu Co.) according to a gas method using hydrogen, and the results are provided in the following Table 1.

(Average Particle Diameter ($D_{50}$) of Primary Particles)

The average particle diameter ($D_{50}$) of the primary particles was measured using an S4500 scanning electron microscope (available from Hitachi Ltd).

(Average Particle Diameter ($D_{50}$) of Secondary Particles)

An LA-910 laser diffraction particle size analyzer (available from Horiba International Co.) was used to measure the average particle diameter ($D_{50}$) of the secondary particles.

TABLE 1

| | Porous material | Tap density (g/cc) | True density (g/cc) | Average particle diameter (D50) | |
| --- | --- | --- | --- | --- | --- |
| | | | | Primary particle (nm) | Secondary particle (μm) |
| Preparation Example 1 | NCM | 0.80 | 4.7 | 100 | 3.5 |
| Preparation Example 2 | NCA | 0.65 | 4.5 | 90 | 4.2 |
| Preparation Example 3 | NCM + Mg | 0.72 | 4.75 | 80 | 4.0 |

Manufacture of Positive Electrode

Preparation Example 4

90 wt % of the porous material of Preparation Example 1, 5 wt % of polyvinylidene fluoride, and 5 wt % of acetylene black were mixed to form a mixture, and the mixture was dispersed in N-methylpyrrolidone to prepare a slurry. Subsequently, the slurry was coated on a 15 μm-thick aluminum substrate, dried at 100° C., and compressed, thereby manufacturing a positive electrode having a mass density of 3.0 g/cc and a thickness of 70 μm.

Preparation Example 5

A positive electrode was manufactured as in Preparation Example 4 except that the porous material of Preparation Example 2 was used instead of the porous material of Preparation Example 1.

Preparation Example 6

A positive electrode was manufactured as in Preparation Example 4 except that the porous material of Preparation Example 3 was used instead of the porous material of Preparation Example 1.

Preparation Example 7

A positive electrode was manufactured as in Preparation Example 4 except that 85 wt % of the porous material of Preparation Example 3, instead of the porous material of Preparation Example 1, and 5 wt % of activated carbon having an average particle size of 10 μm (available from Kuraray Co., Ltd.) were mixed with 5 wt % of polyvinylidene fluoride, and 5 wt % of acetylene black.

Preparation Example 8

A positive electrode was manufactured as in Preparation Example 4 except that 90 wt % of $LiCoO_2$ having an average particle diameter ($D_{50}$) of 5 μm, a tap density of 2.5 g/cc, and a true density of 5.0 g/cc, instead of the porous material of Preparation Example 1, was mixed with 5 wt % of polyvinylidene fluoride, and 5 wt % of acetylene black.

Manufacture of Negative Electrode

Preparation Example 9

85 wt % of graphite having an average particle diameter of 8 μm (available from Mitsubishi Chemical Co.), 10 wt % of polyvinylidene fluoride, and 5 wt % of acetylene black were mixed, and the mixture was dispersed in N-methylpyrrolidone, thereby preparing slurry. Subsequently, the slurry was coated on a 10 μm-thick copper substrate, dried at 100° C., and compressed, thereby manufacturing a negative electrode having a mass density of 1.4 g/cc and a thickness of 90 μm.

Preparation Example 10

A phenolic resin was cured and fired at 1200° C. under an inert atmosphere, thereby obtaining a solid. The solid was ground to an average particle diameter ($D_{50}$) of 10 μm with a ball mill, thereby obtaining hard carbon.
85 wt % of the hard carbon, 10 wt % of polyvinylidene fluoride, and 5 wt % of acetylene black were mixed to form a mixture, and the mixture was dispersed in N-methylpyrrolidone, thereby preparing a slurry. Subsequently, the slurry was coated on a 10 μm-thick copper substrate, dried at 100° C., and compressed, thereby manufacturing a negative electrode having a mass density of 1.2 g/cc and a thickness of 100 μm.

Manufacture of Rechargeable Lithium Battery Cell

Example 1

The positive electrode of Preparation Example 4, the negative electrode of Preparation Example 9 and a separator between the positive and negative electrodes were used to manufacture a jelly-roll. The jelly-roll was inserted into a 18650-sized case, and an electrolyte solution was injected therein, thereby manufacturing a rechargeable lithium battery cell.
Here, the electrolyte solution was prepared by mixing ethylenecarbonate (EC) and ethylmethylcarbonate (EMC) in a volume ratio of 3:7 to form a mixed solution, and dissolving 1.0M $LiPF_6$ in the mixed solution. The separator was a polyethylene porous film.

Example 2

A rechargeable lithium battery cell was manufactured as in Example 1 except that the positive electrode of Preparation Example 5 was used instead of the positive electrode of Preparation Example 4.

Example 3

A rechargeable lithium battery cell was manufactured as in Example 1 except that the positive electrode of Preparation Example 6 was used instead of the positive electrode of Preparation Example 4.

Example 4

A rechargeable lithium battery cell was manufactured as in Example 1 except that the positive electrode according to Preparation Example 7 was used instead of the positive electrode of Preparation Example 4.

Example 5

A rechargeable lithium battery cell was manufactured as in Example 1 except that the positive electrode according to Preparation Example 7 and the negative electrode according to Preparation Example 10 were used instead of the positive electrode of Preparation Example 4 and Preparation Example 9, respectively.

Example 6

A rechargeable lithium battery cell was manufactured as in Example 5 except that a non-woven fabric cellulose separator was used instead of the polyethylene porous film separator of Example 1.

Comparative Example 1

A rechargeable lithium battery cell was manufactured as in Example 1 except that the positive electrode of Preparation Example 8 was used instead of the positive electrode of Preparation Example 9.

Comparative Example 2

A rechargeable lithium battery cell was manufactured as in Example 1 except that the positive electrode according to Preparation Example 8 and the negative electrode according to Preparation Example 10 were used instead of the positive electrode of Preparation Example 4 and the negative electrode of Preparation Example 9, respectively.

Comparative Example 3

A rechargeable lithium battery cell was manufactured as in Comparative Example 2 except that a cellulose non-woven fabric separator was used instead of the polyethylene porous film separator of Example 1.

Evaluation 2: Characteristics of Rechargeable Lithium Battery Cells

The rechargeable lithium battery cells according to Examples 1 to 6 and Comparative Examples 1 to 3 were constant current-charged at a current of 1.5 A, and the charging was ended (or cut-off) at a battery voltage of 4.2V. In addition, the rechargeable lithium battery cells were constant current-discharged at a current of 1.5 A, and the discharging was ended (or cut-off) at a battery voltage of 2.0V. The discharge capacity at this point was regarded as the initial capacity.

Subsequently, the rechargeable lithium battery cells were constant current-charged at a current of 1.5 A and discharged at a current of 15 A to a battery voltage of 2.0V after ending (or cutting-off) charging at a cell voltage of 4.2V. Then, the high rate discharge capacity of each of the rechargeable lithium battery cells was measured to evaluate the high rate discharge characteristics. The capacity retention (%) of the rechargeable lithium battery cells during high rate discharge was obtained as a percentage of the high rate discharge capacity relative to the initial capacity, and is presented in the following Table 2.

The high rate discharge characteristics of the rechargeable lithium battery cells were evaluated. In addition, to evaluate the high-rate charge characteristics, the high rate charge capacity of each of the rechargeable lithium battery cells was measured by fully discharging each of the rechargeable lithium battery cells and constant current-charging them at a current of 15 A, and then ending (or cutting-off) charging at a battery voltage of 4.2V. The capacity retention (%) of each of the rechargeable lithium battery cells was obtained as a percentage of the high rate charge capacity relative to the initial capacity during the high rate charge, and is presented in the following Table 2.

Each of the rechargeable lithium battery cells was also constant current-charged at room temperature at a current of 1.5 A and fully charged to a cell voltage of 4.2V (e.g., charging was cut-off at a battery voltage of 4.2V). Then, each cell was discharged to 2.0V at a current of 1.5 A under an atmosphere set at a temperature of −20° C., and the low temperature characteristics of each of the rechargeable lithium battery cells were evaluated by comparing the low temperature discharge capacity with the initial capacity. In the following Table 2, the capacity retention (%) at low temperature was obtained as a percentage of the low temperature discharge capacity relative to the initial capacity.

In addition, to evaluate the cycle-life characteristics, each of the rechargeable lithium battery cells was charged 1000 times at a constant current of 6 A to a battery voltage of 4.2V and discharged at a constant current of 6 A to a battery voltage of 2.0V. The capacity retention (%) was obtained as a percentage of the discharge capacity at the 1000th cycle relative to the initial capacity.

TABLE 2

| | Positive electrode | Negative electrode | Separator | Capacity retention at high rate discharge (%) | Capacity retention at high rate charge (%) | Capacity retention at low temp. (%) | Capacity retention after 1000 cycles (%) |
|---|---|---|---|---|---|---|---|
| Example 1 | Preparation Example 4 | Preparation Example 9 | Polyethylene | 80 | 72 | 72 | 73 |
| Example 2 | Preparation Example 5 | Preparation Example 9 | Polyethylene | 82 | 75 | 78 | 71 |
| Example 3 | Preparation Example 6 | Preparation Example 9 | Polyethylene | 84 | 74 | 75 | 77 |
| Example 4 | Preparation Example 7 | Preparation Example 9 | Polyethylene | 84 | 88 | 82 | 82 |
| Example 5 | Preparation Example 7 | Preparation Example 10 | Polyethylene | 84 | 88 | 82 | 86 |
| Example 6 | Preparation Example 7 | Preparation Example 10 | Cellulose | 88 | 90 | 88 | 86 |
| Comparative Example 1 | Preparation Example 8 | Preparation Example 9 | Polyethylene | 48 | 23 | 53 | 58 |
| Comparative Example 2 | Preparation Example 8 | Preparation Example 10 | Polyethylene | 51 | 46 | 55 | 63 |
| Comparative Example 3 | Preparation Example 8 | Preparation Example 10 | Cellulose | 55 | 48 | 58 | 65 |

Referring to Table 2, as can be seen with respect to Examples 1 to 6, the rechargeable lithium battery cells including a positive active material including a porous material having a tap density within an appropriate range described herein showed good high power characteristics and low temperature cycle-life characteristics at high power as compared to the rechargeable lithium battery cells of Comparative Examples 1 to 3, which included a positive active material having a tap density out of an appropriate range as described herein.

While certain exemplary embodiments of this disclosure have been illustrated and described, those of ordinary skill in the art will understand that various modifications and changes can be made to the described embodiments without departing from the spirit and scope of the appended claims, and equivalents thereof. Accordingly, the present invention is not limited to the specific embodiments described and illustrated herein.

What is claimed is:

1. A positive active material for a rechargeable lithium battery, the positive active material comprising a porous material comprising:
   primary particles; and
   secondary particles comprising aggregates of a plurality of the primary particles,
   the porous material having a tap density of 0.3 to less than 1.0 g/cc and a true density of 4.5 g/cc or greater.

2. The positive active material of claim 1, wherein primary particles have an average particle diameter ($D_{50}$) of 50 to 300 nm.

3. The positive active material of claim 1, wherein the secondary particles have an average particle diameter ($D_{50}$) of 2 to 7 μm.

4. The positive active material of claim 1, wherein the primary particles and the secondary particles each comprise a compound selected from lithium manganese oxides, doped lithium manganese oxides, lithium nickel cobalt manganese oxides, doped lithium nickel cobalt manganese oxides, lithium nickel cobalt aluminum oxides, and doped lithium nickel cobalt aluminum oxides.

5. The positive active material of claim 1, wherein the primary particles and the secondary particles each comprise a compound represented by one of Chemical Formulae 1 to 3:

$$LiMn_{2-x}M^1_xO_4 \qquad \text{[Chemical Formula 1]}$$

wherein $M^1$ is Mg, Na, Ca, Sr, Ti, Al, Co, Ni, Fe, Cu, Si, Sn, or a combination thereof, and $0 \leq x < 2$, $$LiNi_aCo_bMn_cM^2_dO_4 \qquad \text{[Chemical Formula 2]}$$

wherein $M^2$ is Mg, Na, Ca, Sr, Ti, Al, Fe, Cu, Si, Sn, or a combination thereof, $0<a<1, 0<b<1, 0<c<1, 0\leq d<1$, and $a+b+c+d=1$, and $$LiNi_eCo_fAl_gM^3_hO_4 \qquad \text{[Chemical Formula 3]}$$

wherein $M^3$ is Mg, Na, Ca, Sr, Ti, Mn, Fe, Cu, Si, Sn, or a combination thereof, $0<e<1, 0<f<1, 0<g<1, 0\leq h<1$, and $e+f+g+h=1$.

6. The positive active material of claim 1, wherein the positive active material further comprises activated carbon.

7. The positive active material of claim 6, wherein the activated carbon is present in the positive active material in an amount of 2 to 10 wt %, based on a total amount of the positive active material.

8. A positive electrode for a rechargeable lithium battery, the positive electrode comprising the positive active material of claim 1.

9. The positive electrode of claim 8, wherein the positive electrode has an active mass density of 1.5 to 3.0 g/cc.

10. A rechargeable lithium battery, the rechargeable lithium battery comprising:
a positive electrode comprising the positive active material of claim 1;
a negative electrode comprising a negative active material; and
a separator between the negative electrode and the positive electrode.

11. The rechargeable lithium battery of claim 10, wherein the negative active material comprises amorphous carbon.

12. The rechargeable lithium battery of claim 10, wherein the separator comprises cellulose.

13. A method for preparing a positive active material for a rechargeable lithium battery, the method comprising:
mixing a metal raw material and an alkaline material to prepare a mixed solution;
obtaining composite alkaline particles from the mixed solution;
mixing the composite alkaline particles and a lithium raw material to prepare a mixture; and
heat treating the mixture to prepare a porous material comprising primary and secondary particles, the porous material having a tap density of 0.3 to 1.0 g/cc and a true density of 4.5 g/cc or greater, and the tap density of the porous material being less than or equal to ¼ of the true density of the porous material.

14. The method of claim 13, wherein the heat treating comprises heating at a temperature of 600 to 1000° C.

15. The method of claim 13, wherein the metal raw material is a metal-containing acetate, a metal-containing nitrate, a metal-containing hydroxide, a metal-containing oxide, a metal-containing sulfate, or a combination thereof.

16. The method of claim 13, wherein the lithium raw material is a lithium carbonate, a lithium acetate, a lithium hydroxide, or a combination thereof.

17. The method of claim 13, wherein the alkaline material is ammonium hydroxide ($NH_4OH$), sodium hydroxide (NaOH), or a combination thereof.

18. The method of claim 13, wherein the ratio of composite alkaline particles and lithium raw material is 1:1.01 to 1:1.10.

19. The positive active material of claim 1, wherein the tap density of the porous material is less than or equal to ¼ of a true density of the porous material.

* * * * *